Jan. 14, 1964   F. J. SPORNY   3,117,482
HAND GUIDE
Filed April 28, 1960

INVENTOR
Ferdinand Joseph Sporny

United States Patent Office 3,117,482
Patented Jan. 14, 1964

3,117,482
HAND GUIDE
Ferdinand Joseph Sporny, 2377 Academy St., Aliquippa, Pa.
Filed Apr. 28, 1960, Ser. No. 25,480
1 Claim. (Cl. 84—387)

The present invention relates to a hand position guide for musical instruments, and in particular, a hand position guide for musical instruments of the valve family.

The primary object of the invention is to provide a hand position guide for valved musical instruments which will keep the hand in such a proper position that it will facilitate the free and quick movement of the fingers.

In teaching the playing of valved musical instruments, teachers have found that the students tend to place the hand too near the instrument and curve the fingers; this position of the hand constricts the muscles of the hand and hampers the quick movement of the fingers. The quick movement of the fingers is essential in developing a good playing technique.

The present invention places the hand in the proper position to the instrument so that the hand muscles are supple and the fingers are in an extended position, this physical condition permits faster manipulation of the fingers. This present invention will save many hours of practice time for a student and will permit the student's technique to improve more rapidly.

A further object of the invention is to provide a hand position guide for valved musical instruments which is readily detachable from the instrument to permit proper storage and to permit its normal use by a competent musician.

A still further object of the invention is to provide a hand position guide as described above which is inexpensive to manufacture, simple to use, and which is completely effective and practical in its application.

Other objects and advantages will become apparent in the following specification when considered in the light of the attached drawings, in which.

Figure 1:
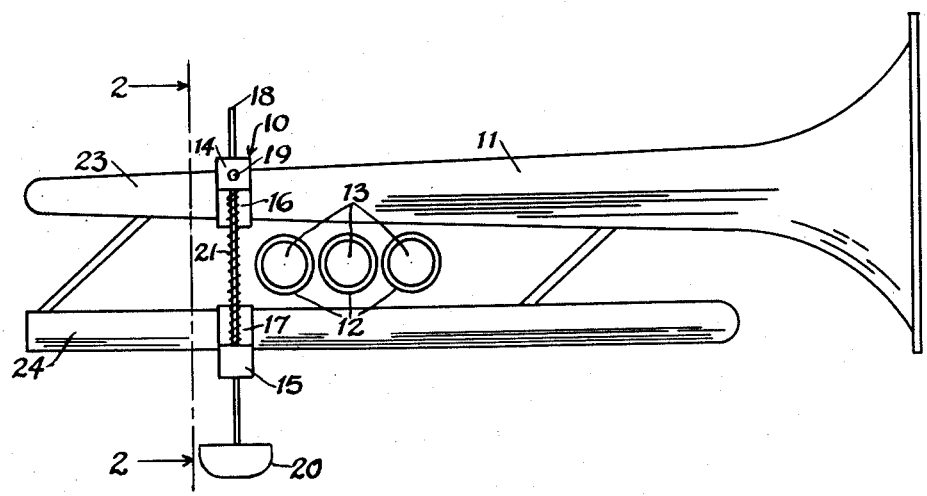
FIGURE 1 is a top view of the invention shown attached to a trumpet.
Figure 2:
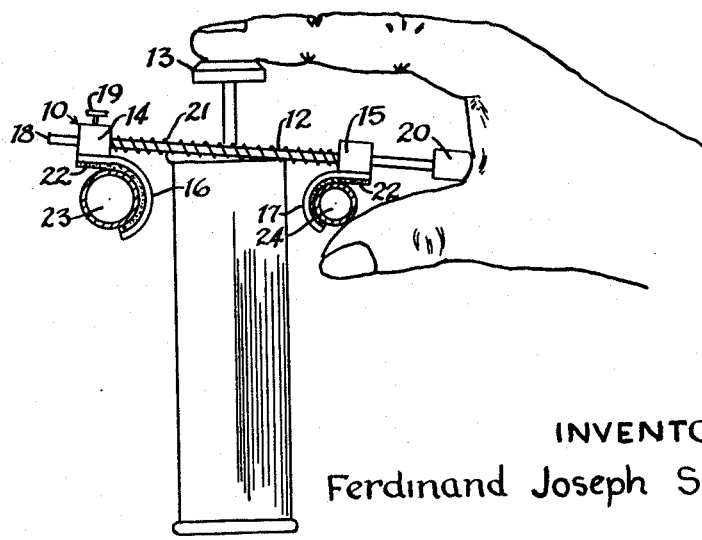
FIGURE 2 is a fragmentary transverse cross-section taken from FIGURE 1 looking in the direction from left to right or in the normal playing position as seen by the student.

Referring now to the drawings in detail wherein like reference characters indicate like parts throughout the several figures, and considering first, FIGURES 1 and 2, the reference numeral 10 indicates a hand position guide constructed in accordance with the invention.

The hand position guide 10 is illustrated in FIGURES 1 and 2 as attached to a trumpet 11, the notes of which are partially controlled by valves 12 by means of actuator push buttons 13.

The trumpet 11 is of conventional design and forms no part of the present invention.

The hand position guide 10 includes a pair of bars 14 and 15 each having a semi-circular hooked end 16 and 17 formed integrally therewith. The inner surface of each of the semi-circular hooked end portions 16 and 17 have adhesively secured thereto a soft cloth pad 22 for engagement with the trumpet 11 as illustrated in cross-section FIGURE 2.

The bars 14 and 15 have an aperture that is used to mount the bars 14 and 15 on slide bar 18. Bar 15 and integral attached semi-circular hook 17 move freely on slide rod 18. Bar 14 and integrally attached semi-circular hook 16 is held firmly in properly adjusted position by set screw 19.

The slide rod 18 has attached on its right end (FIGURE 2) a position bar 20.

Pressure spring 21 is inserted on slide rod 18 between bar assembly 14 and 15 as illustrated in FIGURES 1 and 2.

In the use and operation of the invention, the semi-circular hook 16 is placed over the trumpet bell tube 23, the semi-circular hook 17 is placed over the trumpet mouth-pipe 24. The hand position guide 10 is held firmly in the proper position on the trumpet 11 by means of the pressure spring 21 as becomes apparent in FIGURES 1 and 2.

The adjustment of the hand position guide 10 to the individual student is done by moving slide rod 18 in the bar 14 and held secure in position by set screw 19 as shown in FIG. 2.

The trumpet 11 is played in the normal manner by placing the fingers on the actuator buttons 13 with the position bar 20 adjusted to the student's hand, thus causing the fingers to be in horizontal and parallel position with the thumb. Thus the hand position guide 10 will place the fingers of the hand in such a position as to facilitate the quick manipulation of the actuator buttons 13 of the trumpet 11 valves 12.

While I have illustrated the present invention, providing a hand position guide for trumpets it should be understood that numerous modifications may be resorted to, to adapt the instant invention to other instruments and to instruments of different sizes, without departing from the scope of the appended claim.

I claim as my invention:

A hand positioner for a valved musical instrument having push buttons to be actuated by the fingers of a player's hand for operating the valves, the said positioner comprising a stud and means connected to said instrument for suspending said stud from said instrument generally perpendicularly to said buttons in a position to engage the palm of the hand with which said buttons are operated between the thumb and the fingers to set said fingers so that their tips are over said buttons in operating position, said suspending means including means for adjusting the position of said stud so that it can be set for the hands of different operators.

References Cited in the file of this patent

UNITED STATES PATENTS

| | | |
|---|---|---|
| 853,074 | Evans & Wolff | May 7, 1907 |
| 2,765,695 | Brennan | Oct. 9, 1956 |
| 2,918,383 | Worrel | Dec. 29, 1959 |